United States Patent
Matveev et al.

(10) Patent No.: US 12,033,053 B1
(45) Date of Patent: *Jul. 9, 2024

(54) SYSTEM AND METHOD OF DETERMINING AND EXECUTING DEEP TENSOR COLUMNS IN NEURAL NETWORKS

(71) Applicant: Neuralmagic Inc., Somerville, MA (US)

(72) Inventors: Alexander Matveev, Cambridge, MA (US); Nir Shavit, Cambridge, MA (US); Govind Ramnarayan, Somerville, MA (US)

(73) Assignee: NEURALMAGIC, INC., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,463

(22) Filed: Nov. 23, 2022

Related U.S. Application Data

(63) Continuation of application No. 17/547,458, filed on Dec. 10, 2021, now Pat. No. 11,556,757.
(Continued)

(51) Int. Cl.
*G06N 3/04* (2023.01)

(52) U.S. Cl.
CPC ..................... *G06N 3/04* (2013.01)

(58) Field of Classification Search
CPC ........... G06N 3/04; G06N 3/08; G06F 12/452
See application file for complete search history.

(56) References Cited

U.S. PATENT DOCUMENTS

| 5,577,166 | A | 11/1996 | Mizuno |
| 7,747,070 | B2 | 6/2010 | Puri |

(Continued)

FOREIGN PATENT DOCUMENTS

| CN | 107832839 | 3/2018 |
| EP | 3 037 980 | 6/2016 |

(Continued)

OTHER PUBLICATIONS

Yu, Dong, Li Deng, and Frank Seide. "The deep tensor neural network with applications to large vocabulary speech recognition." IEEE Transactions on audio, speech, and language processing 21.2 (2012): 388-396. (Year: 2012).*

(Continued)

*Primary Examiner* — Kamran Afshar
*Assistant Examiner* — Randall K. Baldwin
(74) *Attorney, Agent, or Firm* — PEARL COHEN ZEDEK LATZER BARATZ LLP

(57) ABSTRACT

Embodiments of the invention may execute a NN by executing sub-tensor columns, each sub-tensor column including computations from portions of a layers of the NN, and each sub-tensor column performing computations entirely within a first layer of cache (e.g. L2 in one embodiment) and saving its output entirely within a second layer of cache (e.g. L3 in one embodiment). Embodiments may include partitioning the execution of a NN by partitioning the execution of the NN into sub-tensor columns, each sub-tensor column including computations from portions of layers of the NN, each sub-tensor column performing computations entirely within a first layer of cache and saving its output entirely within a second layer of cache.

16 Claims, 4 Drawing Sheets

Related U.S. Application Data

(60) Provisional application No. 63/270,291, filed on Oct. 21, 2021.

(56) References Cited

U.S. PATENT DOCUMENTS

| | | | |
|---|---|---|---|
| 9,558,156 | B1 | 1/2017 | Bekas et al. |
| 9,811,775 | B2 | 11/2017 | Krizhevsky et al. |
| 9,818,059 | B1 | 11/2017 | Woo et al. |
| 10,157,045 | B2 | 12/2018 | Venkataramani et al. |
| 10,223,333 | B2 | 3/2019 | Chetlur et al. |
| 10,572,568 | B2 | 2/2020 | Narayanamoorthy et al. |
| 10,685,082 | B2 | 6/2020 | Bekas et al. |
| 10,719,323 | B2 | 7/2020 | Baum et al. |
| 10,832,139 | B2 | 11/2020 | Yan et al. |
| 10,970,619 | B1* | 4/2021 | Xiao ............... G06N 3/045 |
| 11,113,601 | B1* | 9/2021 | Xiao ............... G06N 3/045 |
| 11,216,732 | B2 | 1/2022 | Zlateski et al. |
| 11,556,757 | B1* | 1/2023 | Matveev ........... G06N 3/0495 |
| 2010/0076915 | A1 | 3/2010 | Xu et al. |
| 2011/0119467 | A1 | 5/2011 | Cadambi et al. |
| 2011/0296146 | A1 | 12/2011 | Anand et al. |
| 2012/0311299 | A1 | 12/2012 | Blumrich et al. |
| 2013/0138589 | A1 | 5/2013 | Yu et al. |
| 2015/0127327 | A1 | 5/2015 | Bacchiani et al. |
| 2016/0224465 | A1 | 8/2016 | Morad et al. |
| 2016/0239706 | A1 | 8/2016 | Dijkman et al. |
| 2016/0328643 | A1 | 11/2016 | Liu et al. |
| 2016/0350645 | A1 | 12/2016 | Brothers et al. |
| 2016/0358070 | A1 | 12/2016 | Brothers et al. |
| 2016/0379109 | A1 | 12/2016 | Chung et al. |
| 2017/0103313 | A1 | 4/2017 | Ross et al. |
| 2017/0103317 | A1 | 4/2017 | Young |
| 2017/0132496 | A1 | 5/2017 | Shoaib et al. |
| 2017/0169567 | A1 | 6/2017 | Chefd'Hotel et al. |
| 2017/0193136 | A1 | 7/2017 | Prasad et al. |
| 2017/0193361 | A1 | 7/2017 | Chilimbi et al. |
| 2017/0200094 | A1 | 7/2017 | Bruestle et al. |
| 2017/0220524 | A1 | 8/2017 | Herrero Abellanas et al. |
| 2017/0316311 | A1 | 11/2017 | Pilly et al. |
| 2017/0316312 | A1 | 11/2017 | Goyal et al. |
| 2017/0032487 | A1 | 12/2017 | Ashari et al. |
| 2017/0372202 | A1 | 12/2017 | Ginsburg et al. |
| 2018/0046900 | A1 | 2/2018 | Dally et al. |
| 2018/0096226 | A1 | 4/2018 | Aliabadi et al. |
| 2018/0173571 | A1 | 6/2018 | Huang et al. |
| 2018/0253402 | A1 | 9/2018 | Redfern et al. |
| 2018/0315159 | A1 | 11/2018 | Ould-Ahmed-Vall et al. |
| 2018/0322390 | A1 | 11/2018 | Das et al. |
| 2018/0336468 | A1 | 11/2018 | Kadav et al. |
| 2019/0042250 | A1 | 2/2019 | Anders et al. |
| 2019/0042542 | A1 | 2/2019 | Narayanamoorthy et al. |
| 2019/0056916 | A1 | 2/2019 | Varma et al. |
| 2019/0138902 | A1* | 5/2019 | Matveev ............ G06N 3/04 |
| 2019/0156206 | A1 | 5/2019 | Graham et al. |
| 2019/0156214 | A1 | 5/2019 | Matveev et al. |
| 2019/0156215 | A1 | 5/2019 | Matveev et al. |
| 2019/0179818 | A1 | 6/2019 | Lee |
| 2019/0205759 | A1 | 7/2019 | Zhang |
| 2019/0212982 | A1 | 7/2019 | Yoda et al. |
| 2019/0303743 | A1 | 10/2019 | Venkataramani et al. |
| 2019/0318225 | A1 | 10/2019 | Heineke et al. |
| 2019/0354894 | A1 | 11/2019 | Lazovich et al. |
| 2019/0370071 | A1* | 12/2019 | Matveev ............ G06N 3/084 |
| 2019/0370644 | A1 | 12/2019 | Kenney et al. |
| 2020/0034710 | A1 | 1/2020 | Sidhu et al. |
| 2020/0089534 | A1 | 3/2020 | Chen et al. |
| 2020/0090024 | A1 | 3/2020 | Chen et al. |
| 2020/0097826 | A1 | 3/2020 | Du et al. |
| 2020/0104717 | A1 | 4/2020 | Alistarh |
| 2020/0117999 | A1* | 4/2020 | Yoon ............... G06F 12/0862 |
| 2020/0160181 | A1* | 5/2020 | Zlateski ............ G06N 3/08 |
| 2020/0160182 | A1* | 5/2020 | Matveev ............ G06N 3/045 |
| 2020/0193274 | A1 | 6/2020 | Darvish Rouhani et al. |
| 2020/0218978 | A1 | 7/2020 | Kopinsky |
| 2020/0320400 | A1 | 10/2020 | David |
| 2020/0342301 | A1 | 10/2020 | Miao et al. |
| 2021/0027197 | A1 | 1/2021 | Foerster et al. |
| 2021/0049463 | A1* | 2/2021 | Ruff ............... G06N 3/045 |
| 2021/0174190 | A1 | 6/2021 | Janssen et al. |
| 2022/0188631 | A1 | 6/2022 | Kindrat |

FOREIGN PATENT DOCUMENTS

| | | |
|---|---|---|
| WO | WO 2017/049496 | 3/2017 |
| WO | WO 2018/053835 | 3/2018 |
| WO | WO 2019/090325 A1 | 5/2019 |
| WO | WO 2020/046859 A1 | 3/2020 |
| WO | WO 2020047823 A1 | 3/2020 |
| WO | WO 2020/072274 A1 | 4/2020 |

OTHER PUBLICATIONS

Smith, Shaden, et al. "SPLATT: Efficient and parallel sparse tensor-matrix multiplication." 2015 IEEE International Parallel and Distributed Processing Symposium. IEEE, 2015: 61-70 (Year: 2015).*

Liu, Baoyuan, et al. "Sparse convolutional neural networks." Proceedings of the IEEE conference on computer vision and pattern recognition. 2015: 806-814 (Year: 2015).*

Yang, Yongxin, and Timothy Hospedales. "Deep multi-task representation learning: A tensor factorisation approach." arXiv preprint arXiv:1605.06391 (2016): 1-12 (Year: 2016).*

Matveev, Alexander, et al. "A multicore path to connectomics-on-demand." Proceedings of the 22nd ACM SIGPLAN Symposium on Principles and Practice of Parallel Programming. 2017: 267-281 (Year: 2017).*

Georganas, Evangelos, et al. "Anatomy of high-performance deep learning convolutions on simd architectures." SC18: International Conference for High Performance Computing, Networking, Storage and Analysis. IEEE, 2018. (Year: 2018).*

Gelashvili, Rati, Nir Shavit, and Aleksandar Zlateski. "L3 fusion: Fast transformed convolutions on CPUs." arXiv preprint arXiv: 1912.02165 (Dec. 4, 2019). (Year: 2019).*

Lin, Yu-Sheng, Wei-Chao Chen, and Shao-Yi Chien. "Merit: Tensor transform for memory-efficient vision processing on parallel architectures." IEEE Transactions on Very Large Scale Integration (VLSI) Systems 28.3 (2019): 791-804. (Year: 2019).*

Dong, Xiao, et al. "Acorns: A framework for accelerating deep neural networks with input sparsity." 2019 28th International Conference on Parallel Architectures and Compilation Techniques (PACT). IEEE, 2019. (Year: 2019).*

Kim, Hyeonjin, et al. "Duplo: Lifting redundant memory accesses of deep neural networks for GPU tensor cores." 2020 53rd Annual IEEE/ACM International Symposium on Microarchitecture (MICRO). IEEE, Oct. 2020. (Year: 2020).*

Final Office Action for U.S. Appl. No. 17/970,703, dated Jun. 23, 2023.

Deshpande, A beginner's guide to understanding convolutional neural networks, Jul. 20, 2016.

Alwani et al., "Fused-layer CNN accelerators." 49th Annual IEEE/ACM International Symposium on Microarchitecture (MICRO), 2016, pp. 1-12.

Du et al., "Width Provably Matters in Optimization for Deep Linear Neural Networks", May 27, 2019, arXiv:1901.08572v3.

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015.

Lavin et al., "Fast Algorithms for Convolutional Neural Networks", Nov. 10, 2015.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017.

Rusu et al., "Progressive Neural Networks", Sep. 7, 2016.

(56) References Cited

OTHER PUBLICATIONS

Budden et al., "Deep tensor convolution on multicores", In Proceedings of the 34th International Conference on Machine Learning, 2017, vol. 70, pp. 615-624.
Chen, Xuhao, "Escoin: Efficient Sparse Convolutional Neural Network Inference on GPUs." From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdb entire document.
Georganas et al., "Anatomy of High-Performance Deep Learning Convolutions on SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567.pdf entire document.
Kaya et al., "Scalable sparse tensor decompositions in distributed memory systems", SC'15: Proceedings of the International Conference for High Performance Computing, Networking, Storage and Analysis, IEEE, 2015. (Year: 2015).
Kim et al., "Designing Vector-Friendly Compact BLAS and LAPACK Kernels", SC17, Nov. 12-17, 2017, Denver, CO, USA.
Lascorz et al., "Bit-Tactical: Exploiting Ineffectual Computations in Convolutional Neural Networks: Which, Why, and How", Mar. 9, 2018.
Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020.
Papyan et al., "Convolutional neural networks analyzed via convolutional sparse coding." In: The Journal of Machine Learning Research. Jul. 17, 2017 (Jul. 17, 2017) Retrieved on Feb. 20, 2020.
Scardapane et al. "Group sparse regularization for deep neural networks.", In: Neurocomputing. Jul. 2, 2016 (Jul. 2, 2016) Retrieved on Nov. 16, 2019 (Nov. 16, 2019).
Smith et al., "SPLATT: Efficient and parallel sparse tensor-matrix multiplication", 2015 IEEE International Parallel and Distributed Processing Symposium, IEEE, 2015, (Year: 2015).
Wozniak et al., "GIMMiK-Generating bespoke matrix multiplication kernels for accelerators: Application to high-order Computational Fluid Dynamics", Computer Physics Communications, vol. 202, 2016, pp. 12-22.
Zhangxiaowen Gong et al. "Sparse Train: Leveraging Dynamic Sparsity in Training DNNs on General-Purpose SIMD Processors"; 2019.
Kurtz, Mark, et al. "Inducing and Exploiting Activation Sparsity for Fast Neural Network Inference." Proceedings of the International Conference on Machine Learning. 2020.
Robert Lim; "Methods for Accelerating Machine Learning in High Performance Computing"; University of Oregon—AREA-2019-01.
Zhizhou Li et al.; "A CPU-based Algorithm for Traffic Optimization Based on Sparse Convolutional Neural Networks"; 2017 IEEE 30th Canadian Conference on Electrical and Computer (CCECE).
Baoyuan Liu et al.; "Sparse Convolutional Neural Networks"; CVPR 2015—Computer Vision Foundation—IEEE.
Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.
Israt Nisa et al.; "Sampled Dense Matrix Multiplication for High-Performance Machine Learning"; 2018 IEEE 25th International Conference on High Performance Computing (Hi PC).
Yang, Huanrui, Wei Wen, and Hai Li. "Deephoyer: Learning sparser neural network with differentiable scale-invariant sparsity measures." arXiv preprint arXiv:1908.09979 (2019).
Yuster, Raphael, and Uri Zwick. "Fast sparse matrix multiplication." ACM Transactions on Algorithms (TALG) 1.1 (2005): 2-13.
Paixao, Crysttian A., and Flávio Codeço Coelho. Matrix compression methods. No. e1049. PeerJ PrePrints, 2015.
Park, Jongsoo, et al. "Faster cnns with direct sparse convolutions and guided pruning." arXiv preprint arXiv:1608.01409 (2016).
https://www.kinematicsoup.com/news/2016/9/6/data-compression-bit-packing-101, published Sep. 6, 2016.
Williams, Samuel, Andrew Waterman, and David Patterson. "Roofline: an insightful visual performance model for multicore architectures." *Communications of the ACM* 52.4 (2009): 65-76.
Notice of Allowance for U.S. Appl. No. 17/970,703 dated Dec. 6, 2023.

* cited by examiner

SYSTEM AND METHOD OF DETERMINING AND EXECUTING DEEP TENSOR COLUMNS IN NEURAL NETWORKS

RELATED APPLICATION DATA

The present application is a continuation of prior U.S. patent application Ser. No. 17/547,458 filed on Dec. 10, 2021, now U.S. Pat. No. 11,556,757, which in turn claims benefit from U.S. provisional Patent Application No. 63/123,908, filed on Dec. 10, 2020, entitled "DEEP TENSOR COLUMN ALGORITHM", each incorporated herein by reference in its entirety.

FIELD OF THE INVENTION

The present invention relates generally to the field of neural networks. More specifically, the present invention relates to executing sections of neural networks spanning multiple layers.

BACKGROUND OF THE INVENTION

Neural networks (NN) or connectionist systems are computing systems inspired by biological computing systems, but operating using manufactured digital computing technology. NNs are made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons or nodes are divided or arranged into layers, where different layers can perform different kinds of transformations on their inputs and can have different patterns of connections with other layers.

NN systems can learn to perform tasks by considering example input data, generally without being programmed with any task-specific rules, being presented with the correct output for the data, and self-correcting, or learning.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example transformer NNs, useful for speech or natural language applications, and long short-term memory (LSTM) networks.

In practice, a NN, or NN learning, can be simulated by one or more computing nodes or cores, such as generic central processing units (CPUs, e.g. as embodied in personal computers) or graphics processing units (GPUs such as provided by the NVIDIA Corporation), which can be connected by a data network. A NN can be modelled as an abstract mathematical object and translated physically to CPU or GPU as for example a sequence of matrix operations where entries in the matrix represent neurons (e.g. artificial neurons connected by edges or links) and matrix functions represent functions of the NN.

Typical NNs can require that nodes of one layer depend on the output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of compute power, on the order of 10s or even 100s of Teraflops, or a large set of cores. On modern GPUs this can be done using 4,000-5,000 cores.

One difficulty with computing each layer at a time can include a requirement that memory size used to store intermediate layer values be driven by a width of the largest layer in the particular NN.

SUMMARY OF THE INVENTION

Embodiments of the invention may execute a NN by executing sub-tensor columns, each sub-tensor column including computations from portions of a layers of the NN, and each sub-tensor column performing computations entirely within a first layer of cache (e.g. L2 in one embodiment) and saving its output entirely within a second layer of cache (e.g. L3 in one embodiment). Embodiments may include partitioning the execution of a NN by partitioning the execution of the NN into sub-tensor columns, each sub-tensor column including computations from portions of layers of the NN, each sub-tensor column performing computations entirely within a first layer of cache and saving its output entirely within a second layer of cache. While L2 and L3, and private and shared, caches are used as examples, other types of layers of cache may be used. Further, while certain processes are associated in examples herein with certain caches (e.g. sub-tensors executing within private cache) in other embodiments processes may operate with different caches, sub-tensors need not execute within a private cache.

According to some embodiments of the invention, one or more (e.g., each) tasks can be executed by a single compute core, encompassing a part of the computation (e.g., the NN inference) that can optimize the cache and/or compute capabilities of this individual core. One improvement from this approach can be to reduce the amount of data brought to memory at any given time so that it can be proportional to (e.g., fully reside in) the total amount of core cache memory and may be agnostic to a size of any given network layer. Another benefit of this approach can be that it can also turn computations that are memory bound into ones that are compute bound for the most complex convolutional transforms and computations. This can speed up the execution of NNs because, for example, it can allow the processing units to use their limited memory bandwidth resource more efficiently. The subset of network nodes executed across layers instead of having all nodes in a layer execute before moving to the next layer can form an abstract shape of a pyramid. According to some embodiments, in a tensor column or pyramid implementation, a first set of tasks (e.g. a tensor or sub-tensor) may output to a second set of tasks which may output to a third set of tasks, etc.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
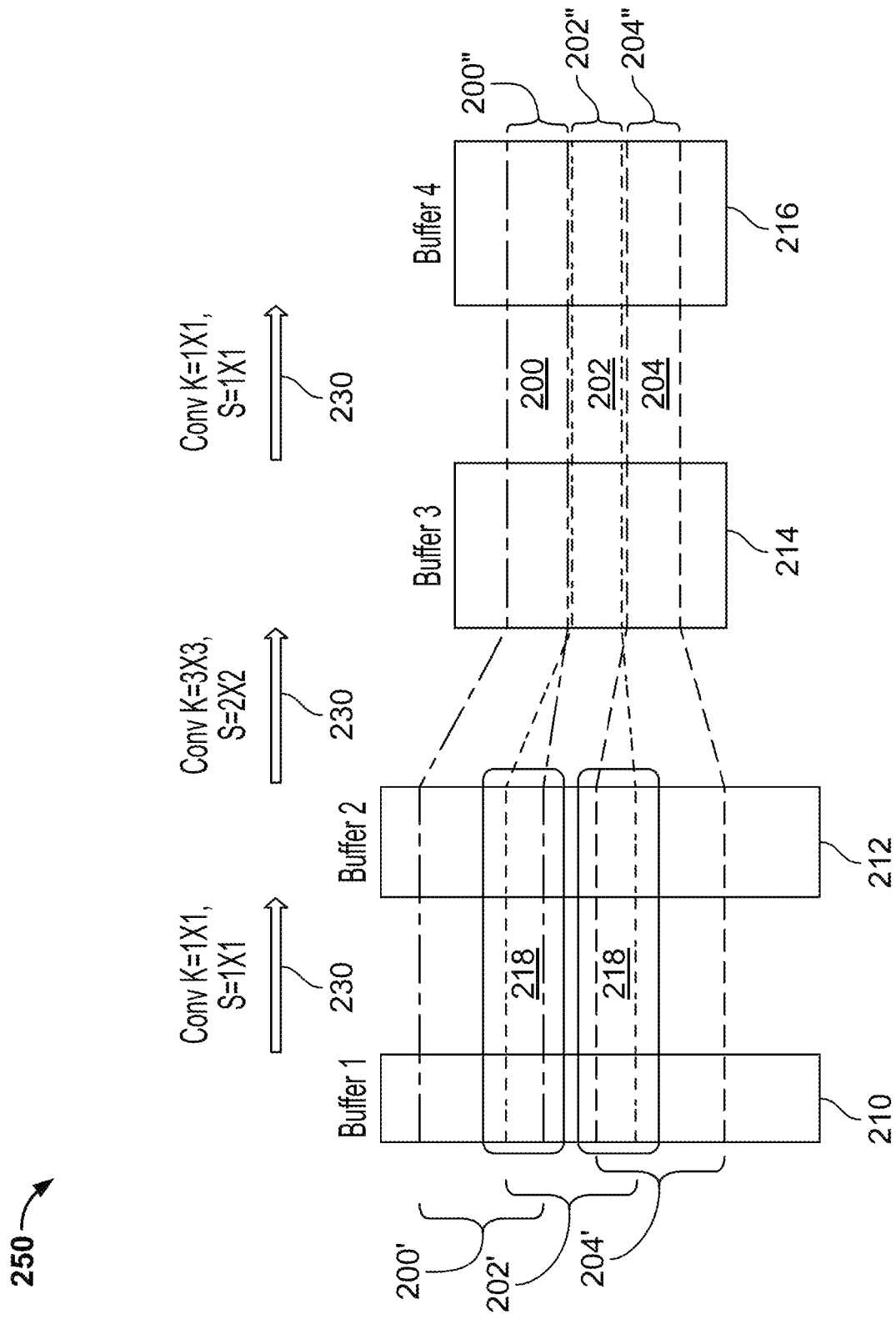
FIG. 1 depicts an example tensor or pyramid division of NN computation, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer or other electronic computing device, that manipulates and/or transforms data represented as physical (e.g., electronic) quantities within the computer's registers or memories into other data similarly represented as physical quantities within the computer's registers and/or memories or other non-transitory storage medium that may store instructions to perform operations and/or processes.

The term set when used herein may include one or more items. Unless explicitly stated, the method embodiments described herein are not constrained to a particular order or sequence. Some of the described method embodiments or elements thereof can occur or be performed simultaneously, at the same point in time, or concurrently.

NNs are often organized in layers, from input through hidden layers, to output, where layers closer to the input typically execute in an execution order before layers towards the output. When discussed herein a previous or earlier layer is located more towards the input of the NN than layers that are later, after, or subsequent: thus typically layer X immediately previous to layer Y sends its output to layer Y, and layer Y is subsequent to layer X. An earlier layer more towards NN input is before a later layer that is more towards NN output. Going backwards typically means going towards NN input.

In prior systems for executing NNs, during execution a layer may be executed and after all of the outputs of the layer are written, only at this point, the outputs of the layer may be read as input to the subsequent layer. Thus previously available systems may require complete processing of one layer before moving on to compute or execute the next layer. This may cause excessive memory access, as the outputs need to be written to memory then read again. Some systems may ameliorate this problem by dividing NN processing into tensor columns or pyramids, where each of a number of layers is only partially processed, with the partial output of one layer being provided as the partial input to another layer, with the intermediate output/input between layers being stored in a processor's cache without being written to/read from memory (e.g. an external memory, separate from the processor(s), which typically has much larger read/write times than cache storage). This reduces the delay of writing and reading from memory, but may introduce the problem of repeated processing of some NN calculations.

Embodiments of the present invention attempt to both reduce memory access and reduce the increase in multiple processing of the same outputs that may result from tensor column or pyramid divisions. Embodiments may break down the computation graph of a NN into very deep tensor columns (e.g. computations or sub computations or tasks) tasks, ones that span many layers or even the entire NN.

Pyramid or tensor column embodiments may process a NN by dividing computations (e.g., training of the NN and/or executing or inferring the NN) into tasks in a manner that can be agnostic to the layered structure of the network. The NN may thus be broken down into asynchronously executable pyramid-shaped or tensor column-related tasks that can cross layer boundaries. Systems and methods for executing (e.g., inferring) and/or training of NNs may employ computation among general-dimension matrices, commonly referred to as "tensors". A tensor column may be considered to be a unit of computation (e.g. a task, computational task or sub-computation) that starts with a certain area of the input of a NN and ends up in a certain region of the outputs. A tensor column according to one embodiment may have all its computation, through multiple layers, typically executing only a portion of each layer, carried out by having the outputs of one layer be saved in cache as inputs to the next layer, without the need to store them to memory (e.g. memory separate from fast caches; e.g. memory external to a processor). The cache may be used to create a series of buffers that replace reading and writing from memory which is what a typical GPU or similar specialized processor would do. A tensor column may describe a tensor or a set of tensors that may be employed by embodiments of the present invention, and may include computations for a column (rather than a complete layer) of neural nodes of the NN, thus allowing improved parallelism in execution of the NN computations.

Embodiments may ensure, or increase the likelihood, that a process reads or writes to/from cache by designing the process such that the size of the process's memory accesses, in combination with the cache policy of the target architecture on which the process executes, means that when the process's instructions specify writes to or reads from a memory external to the processor, the data instead of requiring a memory access at the time of the execution of the instruction, remains in cache until and unless the data is needed to be read from memory or needs to be written to memory. For example, a process may be designed with instructions that write certain data to memory, but such that the amount of data written (or the structure of the data), means that the cache policy will, at least for some time, keep the data in cache. The data may eventually be written to memory, but hopefully only once, at a later time, rather than requiring repeated memory accesses after each layer. This concept is also applied to the different levels of cache discussed herein: a process may be designed to write to a certain level of cache (e.g. L2) by having the amount and/or structure of memory writes in combination with the cache policy mean that the data stays mostly in L2 cache, at least for some time. Overflows of L2 cache may require access to L3 cache, which may be avoided: e.g. a sub-tensor as described herein may keep its data generally in a private cache without need to access a shared cache, except at the beginning and end of the sub-tensor processing.

Target architectures may include for example AMD's Milan series of processors, or INTEL Intel's Ice Lake processors, ARM processors, and other processors.

In some embodiments, sub-tensors may be created to ensure processing stays in a first layer of cache, e.g. a private cache (note a cache "layer" may include multiple individual caches), and deep tensors may be structured to ensure that input data and the output data for the section of a deep tensors that exists between cache stops (as opposed to data used during processing, which is more relevant in some embodiments to private cache) can fit, at the same time (e.g. both the input and output data) in a cache related to a cache stop, typically a shared cache. Typically, the width of a deep tensor is relevant to or affected by a shared cache.

A sub-tensor or sub-pyramid when discussed herein may be a division of a tensor or pyramid. A tensor, pyramid, sub-tensor and sub-pyramid may be a portion of a NN executed typically as one block separate from the execution of other tensors, pyramids, sub-tensors and sub-pyramids from the same NN; thus the execution of the NN may be partitioned. A tensor, pyramid, sub-tensor and sub-pyramid may refer both to the process that executes the relevant section of the NN, and also to the data structures defining these processes. Typically one sub-tensor executes as one single thread, e.g. in some embodiments sub-tensors and threads are related one-to-one. A sub-tensor may execute subsequent portions of multiple NN layers, at least one portion being less than the entirety of a layer (some sub-tensors may occupy a full layer, although this typically should not occur in an output layer for the sub-tensor).

Embodiments may improve NN processing by using tensors or pyramids while reducing or eliminating redundant or duplicative processing which may occur with such processing. Embodiments may achieve this using "shared cache" stops or "L3" stops (where L3 is one example of a shared cache), where parallel tensors read input and write output to the shared cache at a stop, such that the parallel tensors may read data created by calculations of previously executed parallel tensors, avoiding or eliminating access to memory outside of the processor. An embodiment may include executing a sub-tensor columns, each sub-tensor column executing entirely within a first layer of cache, or entirely within a certain specific cache (e.g. a private cache or cache layer, such as L2; note multiple caches may exist within a certain layer, e.g. multiple private caches, and typically sub-tensor columns execute within a certain single cache which is part of a layer of caches) and saving its output entirely within a "stop" or "shared" layer of cache such as L3 (while multiple caches may exist within a certain layer, typically this second layer of cache includes one cache unit that is shared among cores within a processor). An embodiment may include partitioning the execution of the NN to achieve tensors that execute in this manner Redundant calculations introduced by the division of a NN into tensors may be reduced, although fully eliminating redundant calculations may be inefficient, producing diminishing returns. Redundant calculations more towards NN input, or more towards a cache stop (when moving towards NN input) may have less of a negative impact on NN processing than redundant processing towards the middle of a NN or towards the middle of a region between cache stops.

Sub-tensor columns performing computations entirely within a first layer of cache and saving its output entirely within a second layer of cache may avoid or delay data movements to higher or slower cache levels, or to memory, speeding computations by avoiding slower cache or memory access.

Typically sub-tensors described herein are designed or partitioned to execute on a specific target architecture, such that the cache structure, sizes, and policies of the target architecture allow for sub-tensors to execute keeping input and/or output to the sub-tensor, and all intermediate data in cache (reducing read/write to a different layer of cache or to memory), and to write data after processing such that the written data is also kept in cache (typically a different cache level than that storing data during execution).

In-cache execution, which can be achieved by tensors as shown in FIG. 1, may deliver significant improvement and speedups by utilizing the cache hierarchy of the processor to avoid expensive memory-bound computations. In memory bound computations, performance improvements from software must be achieved by reducing the memory access requirements of the computation or by speeding up data movement (e.g., by reading and/or writing to caches instead of memory).

NN weights and inputs represented as matrices may be calculated faster if sparsity is introduced. A matrix is sparse if it contains a lot of entries that are zero (0). While the input matrix of data to be processed at inference or run time (and the sparsity of the input matrix) is usually out of the network designer's control, the weights of the neural network can be made sparse using pruning. One may, for example, rank the neurons in the network according to how much they contribute, and then remove the low-ranking neurons from the network by setting their matrix entries to 0. The resulting sparse network can have the same or improved accuracy relative to the original network. Even if some accuracy is lost, the resulting network could be smaller and could have a smaller memory footprint with a proper sparse matrix representation. Computation during the matrix multiplication may be reduced if multiplying by the entries of the weight matrix that are zero is avoided. Compute (processor calculations) can be reduced, e.g. by 10 to 20 times, using sparsity. Sparsity in combination with deep tensor columns as described by embodiments of the present invention may allow CPUs to process as fast as GPUs, an improvement to NN processing, as CPU usage may be less expensive and more flexible.

Embodiments combined with sparse neural network computation increase improvements, since computations in the context of sparsity may be more memory bound than those of dense NNs. Sparsification reduces the amount of computation needed to execute the network, but also reduces the rate of computation by the CPU, since it makes the computation more memory-bound. To improve performance of sparse NNs, embodiments of the present invention may rewrite sections of the computation with deep tensor columns, to reduce the reads and writes to memory. Since the computation is memory-bound, this directly improves the CPU's rate of computation. Reducing the number of memory accesses via tensor columns makes the workload less memory-bound, increasing effective performance. As long as tensor columns do not increase the overall number of FLOPs in the workload by too much, this translates to faster inference.

Tensor columns according to some embodiment may be made by taking a subgraph of the NN computation, including multiple operations, and partitioning it depth wise into tasks that fit into a certain target cache. "Fitting" into a cache may mean that the size of the data used to execute the tensor column (or sub-tensor) is not larger than the target cache, such that after initial data is read from memory or another cache into the target cache, the processor need only read from and write to the target cache in order to carry out its computation. In particular, the processor in some examples does not need to read or write any data to a cache larger than the target cache or main memory in order to carry out the computation. While example subtensor columns when executed replace data in a target cache, as computations place different data in the cache, in some cases evicting some old data from cache and writing to memory may not cause latency as that data is no longer needed for the computation, and the processor does not need to wait on for this memory access to complete. It is noted that for sub-tensors, the input and output data for the beginning and end or processing may come from one layer of cache (e.g. cache-stop cache) but the sub-tensor may be designed so that cache calculation data requires only reading/writing to/from a lower level or smaller cache, such that the sub-tensor "fits" in this lower level cache.

Given a section of the output of some layer in the neural network, a process can take its preimage through multiple preceding layers in the neural network to see what regions of previous layers it depends on. Tensor columns execute these layers depth wise to compute sections of the output without needing to construct the intermediate buffers (e.g. without computing an entire layer) before the output. In doing so, they save on reads and writes to main memory by ensuring that the tasks are executed in cache. On the flip side, they do not reduce the number of FLOPs in the network, even potentially increasing the number of FLOPs. If done incorrectly, tensor columns can significantly slow down neural network inference. Embodiments may include algorithms that find tensor columns that balance the computation and data movement, given the properties of the problem and the cache hierarchy, which improves sparse neural network inference.

FIG. 1 depicts an example tensor or pyramid division of NN computation, according to some embodiments. In FIG. 1, processing of NN 250 may be divided into tensor columns or pyramids 200, 202 and 204, each taking input 200', 202' and 204'; and producing output 200", 202" and 204". Buffers 210, 212, 214 and 216 may be sections of data stored in cache. Multiple convolutional operations 230, which represent NN layers, transform data input from the left to output on the right. Complete in-cache execution (by sizing data such that it is mostly operated on in cache, without the need for memory access) as may occur in FIG. 1 may replace the traditional execution style of neural networks in which inputs and outputs of each layer are written to and accessed from memory. Its benefit is to reduce these expensive accesses to memory with low cost cache hits. The difference in both time and power between reading or writing a data item from cache versus memory may be enormous, and thus deep tensor columns, that avoid most memory accesses, may improve NN execution by enabling low cost and low power execution of NN, in particular on CPUs, and especially CPUs in mobile and other edge devices where power consumption is crucial. Such methods may deliver significant speedups in many other settings by utilizing the cache hierarchy of the processor to avoid expensive memory bound computations. When applied to sparse neural network computation, the benefits may become larger since these computations are typically more memory bound than those of dense neural networks.

However, some disadvantages of tensor computation may be overlaps, e.g. in areas 218, where the processing of inputs to a layer are repeated across tensors. The same processing is performed at different times by different tensor columns, since different tensor columns may require the same input (where they overlap), and that input may be input computed internally in the NN as opposed to the "given" input provided to the NN as input. The structure of neural networks is such that as one goes backward from outputs to inputs, observing which input regions are needed to generate a region in the output, it can be seen that input regions overlap more and more. When the overlapping regions are internal to the tensor column, e.g. there is some layer in the tensor column that produces overlapping outputs, this implies redundant computation for the overlapping tensor columns. The deeper the tensor output layer, the more the computations overlap and the higher the computational cost. The challenge of breaking down a neural network computation into deep tensor columns that span many layers is that the overlaps between tensor columns get exacerbated (they get larger) the deeper the tensor is defined, e.g. the more layers the tensor contains. In some cases, as in FIG. 1, overlaps can increase polynomially in size with an increasing tensor column depth. Keeping a neural network computation in some cache level, say the L2 cache level, would be ideal, but in some cases the overhead of these computations is so high that the benefit of the column allowing the computation to fit in cache is reduced by the cost of the recomputation at overlaps.

Referring to FIG. 1, if one of the three tensor columns 200, 202 and 204 is executed at a time, cache reusage may occur (e.g. memory access is avoided). However, since the region a tensor column depends on as input typically grows towards input, each of the three parallel pyramids or tensor columns 200, 202 and 204 perform some of the same calculations, since their calculations overlap. Overlap in calculations of the tensors may occur where a layer has overlapping output regions across (e.g., sub) tensor columns: the same intermediate data may be computed multiple times across sub-tensor columns. Referring to FIG. 1, portions of intermediate data in Buffer 2 may be computed multiple times across different sub-tensor columns, specifically, the data in the overlapping regions outlined in area 218. Note in some examples computation does not overlap, but inputs do: for example a single 3×3 convolutional layer, executed without division into tensors, may have input data used for the computation overlap across the different applications of this 3×3 window on the input, just by the nature of this convolution. But each of these applications computes a distinct output coordinate, so there are not redundant computations. In some examples, redundant computation cannot occur without overlap in the preimage, but overlap in the preimage sometimes, but does not necessarily, results in redundant computation. Overlap in the preimage may indicate that if the portioning goes back further redundant calculations will occur. Adjacent or serial tensor columns may be considered as being arranged side-to-side when viewing a left-to-right NN depiction (sequential in order of operation) while parallel tensor columns may be considered as generally, with some overlap, executing across the same NN layers but on different sections of those layers. It can be seen that each of tensor columns 200, 202 and 204, while having different output, require some overlapping intermediate buffers, meaning that the same, redundant calculations may be performed in early layers for each of tensor columns 200, 202 and 204 to create this input.

Embodiments may create multiple deep-tensor columns, each parallel to one another and each including multiple serial and parallel sub-tensor columns Each sub-tensor may be partitioned out of layers and out of the larger deep tensor columns, such that each sub-tensor column within a larger deep tensor column is assigned a specific set of layers to compute, with no or reduced overlapping computation within a deep tensor. Each sub-tensor column is shorter than its enclosing tensor column and spans fewer layers. Partitioning the NN may include dividing the NN into sections defined by cache stops and/or NN input or output, or input from or output to sections of the NN that are not partitioned. Cache stops may correspond to a cache—e.g. a layer of cache different from private caches—where during NN processing sub-tensor columns accept input from and output to this cache or layer of cache (sub-tensors may accept input/provide output to/from NN input or output, or sections of the NN that are not partitioned).

Each sub-tensor column typically executes fully within a lower or smaller, possibly local cache, e.g. L2, not having to write to memory or a cache in a higher or larger cache layer; sub-tensor columns within a larger, containing, deep-tensor share their input and output via a higher level, possibly shared, cache, e.g. L3. The sub-tensor data is united in the shared or higher level cache. Executing fully within cache may mean that the thread or process can execute reading and writing to cache only, including intermediate data and processing, without access to memory external to a processor except possibly loading at the start and writing at the end of execution, although typical sub-tensors according to embodiments of the invention may read initial input from and write ending output to a cache layer higher than the cache in which it executes.

In one embodiment the input and output to the sub-tensor columns are the cache corresponding to cache stops (or they are inputs/outputs to the NN itself, or non-partitioned NN sections). In some cases, the data at either input or output of a sub-tensor is typically already in a larger and higher layer of cache (or main memory) than a typically private (e.g., L2) cache used by the sub-tensor to process, so there may be no need to try to fit the input or output into this private cache. In many cases, however, the cache used by a sub-tensor (e.g. a private cache) should fit input and/or output to the sub-tensor and also intermediate data generated by the computation of the sub-tensor. Intermediate data generated by the computation in the sub-tensor column (e.g. represented as "internal" nodes of the sub-tensor column) may be stored only in this private cache (without the need to access a different cache or memory) if the sub-tensor is sized correctly (e.g. if the number of calculations, nodes, data needed, etc. are sized correctly), according to some embodiments; e.g. data generated by internal node processing of the sub-tensor column is sized to be kept in the lower level, private, cache.

Thus sub-tensor columns may perform computations entirely within a first layer of cache (where input to and/or output from the sub-tensor may be saved in the first layer of cache) and save its output entirely within a second layer of cache. Sub-tensor output may need not be kept in a private cache if the sub-tensor is at the end of a deep tensor column, since the output may be written to main memory: in such a case a special instruction may be used to skip writing to cache altogether and write directly to main memory. In some cases, a sub-tensor may load input data from, e.g., memory, into cache used by the sub-tensor. If the cache does not have space for it, the input may be evicted from cache in the middle of computing the first layer in the sub-tensor.

In some special cases, the outputs of deep tensor columns may be read from/written to main memory, and thus these outputs do not need to be kept in a cache. However, data used by the calculations of the internal nodes to sub-tensor columns within the deep tensor column, as discussed, may stay in a lower (than cache stop) level or private cache. Outputs to individual sub-tensor columns that are not the output of the deep tensor are in some embodiments kept in a cache stop cache (this may in some cases apply to inputs to sub-tensors).

To determine if a tensor or sub-tensor fits within a cache, an example process for determining the amount of data needed by a tensor column or pyramid, e.g. a sub-tensor or deep tensor column, may include, given for example:

A) An ordering on the edges/operations in the tensor column.
B) A set of nodes or neurons to be stored (e.g. whose data are stored) in cache. Relevant nodes (nodes the algorithm cares about) may be those stored. When calculating sub-tensors, typically every node is relevant; when calculating deep tensors, typically only nodes reading from or writing to a cache-stop cache are relevant.
C) An output tile size for the output of the tensor column. For example, the tensor may compute a 2×2 spatial tile of the output, and all the output channels.

Given this example input, an example algorithm may include:

1. Given B) (nodes) and C) (output size), compute how much data is needed at each of the nodes (from B)), in order to compute the output tile size given by C). For a sub-tensor column, this data may be exactly what is needed to compute the output tile of the sub-tensor column. For a deep tensor column, this may be similar, but calculated by the data needed to compute all the sub-tensor columns in the deep tensor column.
2. Step through the NN operations in the order given by A). Each operation has some nodes it reads data from, and some nodes it writes data to. For all these nodes, if they are nodes relevant or "cared about" per B)) may be added to a set of "currently active" nodes. The algorithm sums the amount of data needed at each of the currently active nodes (computed for each node in step 1), which is the amount of data needed to keep track of to compute the current operation in the tensor column.
3. Remove a node from the "currently active" nodes after all the operations that read from or write to it have been processed.

The maximum amount of data needed for any of the operations (computed in step 2 for each operation in determining the amount of data needed by a tensor algorithm above), is the amount of data used by the tensor column, which is intended for cache (private, lower for sub-tensor columns; shared, higher cache-stop cache for deep tensor columns). An embodiment may try different output tile sizes for the tensor column (input C. to the algorithm), apply the algorithm to see how much data is required, and make the output tile smaller and smaller until the data required fits into cache (e.g., such that once data is placed into the cache from memory, no memory access or expensive access to another cache layer is required until new data is placed in the cache).

An algorithm determining the amount of data needed by a tensor algorithm for a deep tensor column when used with a recursive breakdown is similar to the three step example process described above, however with step 1 altered to be slightly more complicated. A recursive partition process may partition a deep tensor into sub-deep tensors; this may be accomplished by dividing the set of sub-tensors within a deep tensor into groups of sub-tensors, each group forming part of a sub-deep tensor. In an example where in some section of a deep tensor column there are, for example, 100 sub-tensor columns, if no recursive breakdown is performed, the deep-tensor would need to store the input and output data for all these 100 sub-tensor columns simultaneously in a cache stop cache. If a recursive breakdown is performed, this process is transformed into just storing input data for, for example, 20 sub-tensor columns forming a sub-deep tensor, and output data for the larger tensor collection of 100 sub-tensor columns, simultaneously in a cache stop. This reduces data needed from each node, which affects the output of step 1 in the example algorithm above.

The data to be stored in the lower level cache is typically the intermediate data read/written during the execution of the sub-tensor column, and also input and/or output data to the sub-tensor.

Embodiments of the invention may partition a NN recursively such that its ultimate execution is performed with sub-tensors executing in one layer of cache (e.g. private L2), and groups of parallel sub-tensors within deep tensors reading input from and writing output to a higher, shared cache (e.g. L3). The higher level cache may define a "cache stop" or boundary. Boundaries for tensors or sub-tensors may be other than cache stops; e.g. boundaries may be input to or output from a NN. Accordingly, sub-tensors near the output of a NN may write to memory, obviating the need to store output in cache used by these sub-tensors.

A partition process may include one or more processes of a two-stage or multi-stage process; some embodiments may use only one of the stages. In some embodiments, the stages may alternate processing such that the stages are not done purely one and then another. For example, a rule or heuristic stage may use rules or heuristics first to define cache stops, and then to partition the NN (and thus partition the execution of the NN) into sub-tensors in between the cache stops. An algorithmic stage may use an algorithm to partition the NN into sub-tensors, and by this partition may define cache stops. In some embodiments, the method of defining sub-tensors is the same with a heuristic or algorithmic method. A recursive process may further partition deep tensors into sub-deep tensors, e.g. by grouping sub-tensors.

In an example rule or heuristic stage, rules or heuristics may be used to partition the NN by inserting shared cache or "L3 stops" between certain layers of the NN. For example, for any convolutional layer having a kernel larger than 1×1, a shared cache or L3 stop may be inserted in the NN processing before the input to that layer, such that all tensors prior (closer to input to the NN) to this layer save their output to a shared or L3 cache, termed a cache stop cache. Each section of the NN between cache stops is then divided into multiple sub-tensors. The division into sub-tensors may be performed, for example, by choosing an initial patch at the output just before (towards input of the NN) the cache stop, and proceeding back recursively as in the "algorithmic" partition stage described below. A heuristic method may define cache stops based on the known structure of the given NN rather than calculations. For example, a heuristic may, for any convolutional layer larger than a 1×1 convolutional function, place a cache stop than a 1×1 convolutional function, place a cache stop immediately before the input to this layer, e.g. the input to such a layer will be taken from the cache assigned to the cache stop (e.g. L3).

A more sophisticated heuristic for placing cache stops may be used. For example, a heuristic may choose a different threshold for sizes of convolutional kernels before which it places a cache (e.g. L3) stop, e.g. rather than placing a cache stop at the input of any convolutional layer larger than a 1×1, it may do this only at convolutional layers larger than 2×2 or 3×3, or some other N×N. It may also compute the threshold it uses for kernel sizes as a function of the size of the input "image" to the convolutional layer. For example, if the input image to a convolution is 10×10, the heuristic may place a cache stop at this input if the convolutional window is larger 1×1, but if the input image is 80×80, it may only place a cache stop at the input if the convolutional window is larger than 4×4.

An initial patch from which inputs of a tensor column, e.g. towards the input of the NN, will be determined, whether done at a heuristic or algorithmic stage, may be chosen e.g. by a rule such as starting with a 1×1 output patch or tile. Another rule for choosing an output patch is to choose the largest output tile (e.g. 3×3) such that the sub-tensor calculating that tile, when defined by the region from the output back (towards the input of the NN) to the first L3 stop encountered, fits (performs its calculation entirely within), a given cache such as a private L2 cache; expressed another way an output tile may be chosen so that the resulting subtensor may execute from boundary to boundary (boundary including cache stops, input to the NN, and output of the NN, or other boundaries). In some cases, only a portion of a NN is partitioned into deep tensors, and other parts of the NN execute without being partitioned. Choosing specific output tile sizes may allow tensor columns, e.g. a first tensor column and a second tensor column (each including sub-tensors), to have lower relative compute overlap across sub-tensors. The outputs from the two different tensor columns typically do not overlap, by definition: each tensor column typically writes disjoint output coordinates. However, the outputs may overlap if the tensors aggregate to a single output buffer. In some cases the overlapping outputs may be added to each other. Typically, this overlap in output does not result in overlapping computation.

In both a heuristic and algorithmic embodiment, once a cache L3 stop is placed, the process going backwards is restarted from that placed cache stop, instead of from the original output.

An "algorithmic" partition stage may be used by itself, or if a "heuristic" stage fails to create an adequate partition (e.g. fails to create a partition such that sub-tensors within tensors can fit their data within private cache). As with other partition methods described herein, an algorithmic stage may be performed on its own, without another stage. Such an addition or separate stage may be used in addition to (in the case that a heuristic stage fails or does not provide enough cache stops); or instead of a heuristic stage in some embodiments (e.g. some embodiments may use only an algorithmic method; some embodiments may use only a heuristic method). Further, other methods of creating cache or L3 stops may be used.

An "algorithmic" partition stage, which for example may use calculations, may start by choosing a section or patch of a final or output layer (or another layer, as the entire NN does not have to be partitioned to deep and sub-tensors), and work backwards towards the input of the NN, adding input at each layer, forming a tensor defined in part by the neurons or calculations that need to be performed. The initial "seed" section or patch may be, for example, pre-set, e.g. a 1×1 output patch, or another sized output patch. The input added at each layer may be the input needed to produce a calculation required for the input defined for the tensor at the immediately subsequent layer, e.g. the last added input (which when the process starts may be the seed). Each section of input may correspond to a portion of a layer; and a set of neurons; and/or a set of NN computations: in such a way the definition of the input and of the tensor or sub-tensor may define computations, and a sub-tensor or tensor may define a group of computations spanning layers of the NN.

While the output-to-input addition is occurring, at each stage it may be determined if the computation needed for the sub-tensor built so far, along with the input to and the output from this sub-tensor, can fit within (e.g. execute within) the entirety of a cache termed a "lower" cache, e.g. a private or L2 cache. At the point that it cannot, a cache stop may be placed or defined: the sub-tensor having input added before the point causing the cache capacity to be exceeded may be defined as a sub-tensor, this sub-tensor may be defined as having input from a higher level cache (the cache defining the cache stop), and the process may continue to define multiple sub-tensors at a region closer to the NN input, on the other side of the boundary defined by the cache stop. The input needed for this last sub-tensor defined (which starts on the side of the cache stop closer to the NN output) may be divided into sections or patches, each patch being the seed for a further set of sub-tensors.

An algorithm may start with a first "guess" of a certain large, pre-set patch size of N×N (e.g., the biggest possible patch for simplicity). This initial N×N patch size, along with other information about the sub-tensor, is input to an algorithm that determines the data usage for the sub-tensor. If this data usage exceeds the cache size, the initial N×N patch size is reduced, and the algorithm repeats. The repeating may stop if the determined data usage is less than available cache space. If at some point the patch size cannot be reduced anymore (e.g. when it becomes 1×1) this sub-tensor is too deep and an additional cache stop is introduced. The initial section or patch may be, for example, pre-set, e.g. a N×N output patch where N>1; if the sub-tensors created from this patch do not fit in private cache, they may be divided (e.g. by 2), and the fitting/dividing may repeat. During execution, the input to be generated after the point causing the capacity to exceed the lower cache will be stored in a cache level one higher than that lower cache, termed an "upper" cache, e.g. a shared or L3 cache, which may be the cache stop cache. During an algorithmic stage, sub-tensors may also stop having input added to them at the point a cache stop was defined during a heuristic stage, if a heuristic stage was used: thus in some embodiments cache stops are defined by different methods.

In such a manner a sub-tensor closer to the NN output is defined first, and then recursively, multiple sub-tensors providing input to that earlier-defined sub-tensor are created using a similar process as described with respect to the start of the recursive process: multiple sub-tensors providing input to the earlier sub-tensor are defined until they exceed the capacity of the lower cache, and at that point (the point before which the lower cache capacity is exceeded) a cache stop may be placed or defined. For each of these sub-tensors, the process may repeat, traversing backwards, defining a cache stop, dividing the input into seed patches, and from each seed patch defining a sub-tensor such that multiple sub-tensors feed into one later sub-tensor.

A group of sub-tensors all generated from an initial seed at the output of a NN and all outputting to the same final sub-tensor or group of sub-tensors located at the output of a NN may be considered to belong to the same deep tensor. At each section of the NN between cache stops multiple groups of sub-tensors may exist, each group belonging to a different deep tensor, each group being parallel to another group and including sub-tensors that within the group are parallel to each other. Embodiments may improve NN processing by allowing deep tensors to reduce memory access, keeping processing in cache, but dividing deep tensors to reduce redundant or duplicative processing by having sub-tensors pool output to a shared cache, then having further processing performed by "later" sub-tensors which take their input from shared cache, rather than from redundantly computed "earlier" sub-tensors.

During a recursive stage, an additional constraint, beyond sub-tensors being able to fully execute in a lower cache, may include that both the input to a group of sub-tensors contained within a deep tensor and defined by common borders (e.g. the same cache stops) and the output of this group, must all fit within the higher level cache associated with the stop (e.g. an L3 cache). As a sub-tensor may be built by adding input to the sub-tensor in the direction of the input to the NN, a calculation or tally is made of the input needed for all sub-tensors in the group of sub-tensors within the single deep tensor at the section defined by the latest cache stop, and when both the combined input for all such sub-tensors in the group and the combined output for these sub-tensors exceeds the cache associated with the stop (e.g. an L3 cache), just before this addition, an additional cache stop may be declared or positioned.

For each of deep tensors, sub-deep-tensors, and sub-tensors, it may be that one such partition is created, and this partition is reproduced across the remainder of the NN. For example, an output tile of the NN may be used as the seed for creating a deep tensor including sub-deep-tensors and sub-tensors. This partition may be used to create parallel deep tensor structures corresponding to other output tiles. The same concept may be applied when partitioning into sub-tensors and sub-deep tensors within a deep tensor: one sub-deep tensor partitioned from a deep tensor may be used as a model to create other sub-deep tensors across the network at the section or level of the first sub-deep tensor.

The cache associated with a cache stop may collect output from parallel sub-tensors within the same deep tensor and pass that output to adjacent and subsequent sub-tensors within the same deep tensor. Typically sub-tensors within the same deep tensor execute within the same block of time, such that sub-tensors from different deep tensors do not share data within a cache stop and do not use the same cache within the same block of time. Data is typically not shared using cache stops by different deep tensors. Typically, a cache stop divides different deep tensors at the same point. In some cases multiple deep tensors may execute concurrently, typically using the same cache-stop cache (for example, a typical processor has one L3 cache, although other architectures may be used). This may occur if the deep tensors are sized to fit in the cache stop cache simultaneously: in some cases a single tensor column is sized so that its maximum data usage fits in L3 cache, but its minimum data usage is far below that limit, potentially leaving space for other deep tensors to use the same L3 cache.

A heuristic cache stop placement may move from NN output backwards and when the preimages of multiple output tiles intersect and cause calculations for tensors based on these output tiles to be repeated across tensors, e.g. multiple processing of the same outputs, a cache stop may be placed before this point where redundant compute is detected. Note preimages themselves may overlap in some cases (e.g. a convolutional layer) without causing redundant processing. For example, different sub-pyramids may read overlapping input data from a cache-stop cache.

Embodiments may use separate processes to partition a NN: Cache stops may be defined (e.g. as in Table 1 below and described elsewhere herein); the NN may be broken into sub-tensors, based in part on the private (non-cache-stop) cache used to store intermediate calculations for these sub-tensors (e.g. as in Table 2 below and described elsewhere herein); and a recursive process may be used to break deep tensors (which include multiple sub-tensors) into sub-deep tensors in a recursive manner (e.g. as in Table 3 below and described elsewhere herein). Some embodiments may use only parts of these processes.

Creating sub-tensors within regions of a NN bounded by cache stops (or the input to or output of a NN) may be for the purpose of fitting compute of the sub-tensors into a lower-level or private (e.g. L2) cache, not for the purpose of avoiding compute overlaps, and partitioning into sub-tensors may create compute overlap among the sub-tensors. Cache-stops may be created for the purpose of reducing compute overlaps created when deep tensors are created. Additional compute overlaps created by sub-tensors may be relatively minor and may be created by placement of cache stops.

The Tables below provide example algorithms which may be used to partition a NN into deep tensors and sub-tensors. The Tables below, and the partition algorithms described elsewhere herein, may be performed by an automatic process using, for example, a computer system as in FIG. 3, to produce NN partitions (e.g. pyramids, tensors, sub-tensors, sub-pyramids) which may be executed by a system executing a NN. Table 1 below describes one example of a heuristic method for placing cache stops in a NN:

TABLE 1

Start with an arbitrary partition of the output
of the network into tiles, such that
each tile includes all channels of the output.
Traverse backwards through the graph defining
the NN, starting with an output
tile and taking preimages of operations to track
the data needed in the network for computing
it. Do this for all output tiles simultaneously.
When the preimages of multiple output tiles
intersect, indicating that the
calculations for tensors based on these
output tiles would be repeated across
tensors if the process continued extending
them backwards, place a cache stop at
that data buffer in the NN. (Such an operation
may be considered a generalization
of a heuristic method of placing cache
stops at the beginning of non 1 × 1
convolutions, if one ensures the tiles have
a certain shape, in that they contain all
"channels" in the tensor column). Better
results typically occur when a process
chooses the shape of the tiles correctly
to include all "channels" of convolutions;
not doing so may incur excessive
compute overhead.

Table 2 below describes one example of a method for dividing a NN into subtensors, e.g. to fit sub-tensor columns to fit within a private (e.g. L2) cache, whether used with a heuristic method or algorithmic method:

TABLE 2

Figure 2:
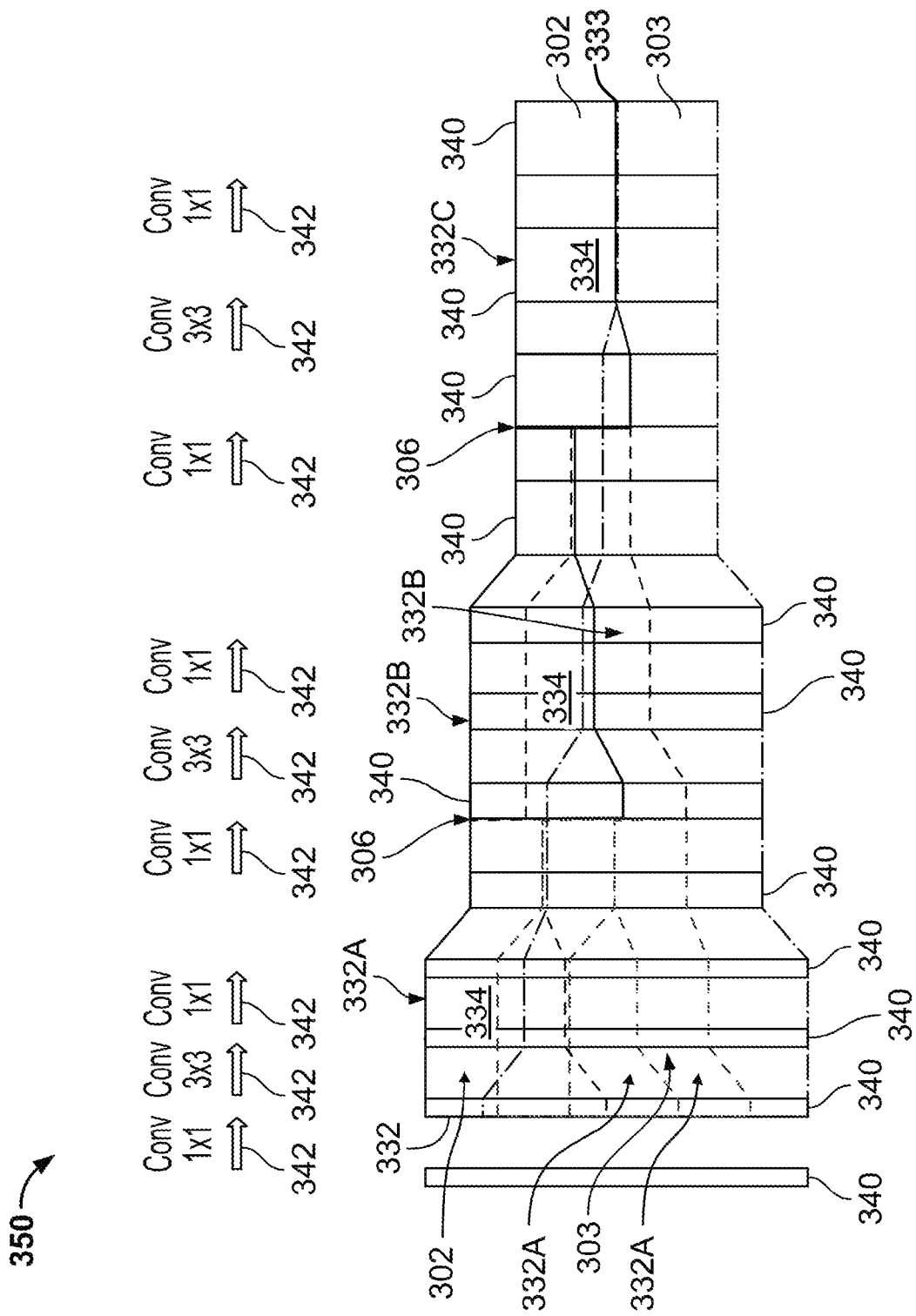
FIG. 2 depicts a breakdown or division of a deep tensor column into sub-tensor blocks, according to embodiments of the present invention.

For every adjacent pair of cache (e.g. L3) stops
such as breaks 306 in FIG. 2 (each adjacent
pair defining a section such as 334 in FIG. 2):
  a. Label or call the first cache stop in the order the "input"
     and the second cache stop the "output".
  b. Starting from output, and starting with output
     tile size equal to the total amount of data at
     the output, e.g., so that there is only one tile, go
     backwards through the network keeping track
     of the amount of data needed to compute an individual
     output tile (including data at cache stops).
     Setting the tile equal to the total amount
     of data at the output size means this initial
     sub-tensor will not fit in private cache unless sequential
     execution of the layers already fit in private
     cache, but it is an initial upper
     bound used for starting the process.
  c. If the amount of data, added to the size of the
     input and output for the sub-tensor, exceeds the size
     of the typically private cache used to compute a
     sub-tensor (note in some cases the output need
     not fit in the private cache), then:
        i. If possible, e.g. the output tile is larger
           than 1 × 1 in spatial dimensions, make the
           output tile size smaller and start over.
        ii. If not possible, insert a cache stop so that
            the data needed to get from this newly inserted
            cache stop to the output, with the smallest
            possible output tile size, fits in the private
            cache used to compute
            a sub-tensor (guaranteed to exist).
  d. While going backwards, when the process reaches a cache stop:
        i. Return (e.g., as function results) the two adjacent
           cache stops (with possibly one of them being
           newly inserted), and the output tile size
           that made the subtensor column between them
           fit into the typically private cache.
(Repeat loop until all adjacent pairs of cache stops are processed,
and no new cache stops need to be added, so that subtensor
columns cover the entire network, or a desired deep tensor column,
if smaller than the entire NN).

Some embodiments may in a recursive process, after dividing a NN into deep tensors, make further partitions based on whether the deep tensors fit in shared cache-stop caches. (At this point in the partition, sub-tensors typically fit into private or lower level caches.) Cache stops may be created as a barrier in which to store output of sub-tensors to avoid repeat calculations and/or to partition the NN to allow the creation of sub-tensors which fit into lower level private caches. As a partition process moves from NN output to NN input, it may be found that a deep tensor does not fit in a cache stop cache. One option is to limit the size of the deep tensor and stop extending the deep tensor backwards at the point where it does not fit in a cache stop cache—in this case, it simply reads from main memory at the point where a process stopped extending it. Another option is recursion: further partition deep tensors into sub-deep-tensors extending backwards towards NN input. A basis for this is that a cache-stop cache is used to hold output from a deep tensor, and this output can be computed in parts. Sub-deep-tensors created recursively may allow sub-deep-tensors partitioned from deep-tensors to extend deep tensors backwards towards NN input. A deep-tensor may be divided along its length, or a deep tensor may have a portion A towards NN input of it divided into a number of parallel sub-deep tensors, executed separately, the combined outputs of these sub-deep-tensors combined to provide input to portion B located more towards NN output. Thus a deep-tensor may include multiple sub-deep tensors (at least with respect to a portion of that deep tensor); deep tensors and sub-deep tensors may include sub-tensors.

A recursive process may move backwards from NN output to input, analyzing the size of a deep tensor relative to a cache-stop cache, and if the output of and input to a section of the deep tensor between cache stops overflows the cache stop cache, instead of creating another cache stop, the process may recursively break the deep tensor column into further deep sub-tensor columns. The effect of this is that a process may only have to store a smaller group of sub-tensors at any one time in a cache-stop cache. When partitioning into sub-deep tensors, there should be enough space to store the output of the entire group of parallel sub-tensors being created in a cache-stop cache, but with the addition to the cache-stop cache of only the input a certain group of sub-tensors at the same time.

A recursive process may be based on sub-tensors within a deep tensor which may allow leaving sub-tensor output sizes of created sub-tensors the same. For example, if a deep tensor is partitioned into 100 sub-tensors between cache stops, a recursive process may partition the deep tensor into five sub-deep tensors each including 20 of the 100 sub-tensors. In this specific example, a process only needs to compute the 100 sub-tensors in groups of 20 at a time, thus reducing the amount of space needed to compute them. This recursive partition may be performed if computing the 100 sub-tensors, and storing their inputs and outputs, requires too much input and output to fit into a cache-stop (e.g. L3) cache. A recursive partition may allow computing the deep tensors one piece at a time, by breaking the sub-computation into sub-deep tensor columns. In this example, the output of each one of these example deep tensor columns is defined by 20 sub-tensors' outputs.

Using sub-tensors as the basis for a partition into sub-deep-tensors may save partition algorithm time: since the sub-tensor output sizes that make the sub-tensors fit into private cache have already been calculated, there is no need to change or re-partition them.

Continuing with the example of a deep tensor partitioned into 100 sub-tensors, the goal of such a partition may be to compute the output of all 100 sub-tensors at a cache stop which is the output of the sub-tensors; however a process does not need to compute all 100 sub-tensors at once. If these 100 sub-tensors are executed in groups of 20, each of these groups of 20 sub-tensors only reads ⅕ the input data at a cache stop which is the input to the sub-tensors, which may allow storage of all the data needed by this group of sub-tensors in a cache-stop (e.g. L3) cache. The only requirement may be that there should be enough space to store the output of the entire group of 100 sub-tensors in the cache-stop cache, with the reduced-size requirement that only the input of 20 sub-tensors at once needs to be stored in a cache-stop cache. During operation, for target processors with certain cache-eviction policies, the cache stop cache at the end (output) of the five sub-deep-tensors stores the output of all five sub-deep-tensors, but stores at various points in time different inputs: inputs to each of the five sub-deep tensors are stored in the same cache stop cache at different points in time.

A recursive process for constructing sub-deep-tensors may be used in conjunction with knowledge of the cache replacement policy of the target processor. In order to minimize the data kept in cache at any point in time, the process may specify that certain data should be prioritized for eviction from cache (e.g. inputs to already-executed sub-deep-pyramids should be prioritized for eviction over outputs of sub-deep-pyramids). Prioritized eviction of certain data from cache may be attainable by an algorithm aware of the cache replacement policy, as well as real-time information about data accesses. For example, if the cache replacement of the target architecture is Least Recently Used (e.g. evicting data that has not recently been used by the processor), the algorithm may be able to purposefully use or "touch" the data just before it gets evicted, thereby keeping desired data in cache and prioritizing other data for eviction. Since the construction/partition algorithm produces code, e.g. is a compiler, the instructions to touch the data may be inserted during code construction with the knowledge (by the compiler) of at what point in the code such touching instructions should be inserted, in light of the cache replacement policy. The compiler may keep track of when, in the code, the last time was that the target data was accessed, by the code being produced, in order to decide when to insert the access/touching instruction.

Table 3 below describes one example of a recursive method for fitting a deep tensor column to fit into a cache defining a cache stop (e.g. an L3 cache). The example algorithm in Table 3 may be executed after cache stops are created, so see if tensors will fit within these cache stops, and then an algorithm such as in Table 3 below may determine if the L3 stops produce proper tensor partitions. For example, an algorithm as in Table 2 may determine where to put cache stops (possibly in addition to using a heuristic method to place cache stops in strategic places to reduce compute). This may result in a set of cache stops needed in order to reduce compute overhead and fit sub-tensors into a private cache; this can be used to determine if the processes fit into the cache used to define cache stops. Some embodiments may iterate between an optimization based on a lower level or private (e.g. L2) cache and a cache-stop cache (e.g. L3), taking into account what partitions or stops have been placed in prior iterations. In some embodiments, private (e.g. L2) optimization being performed first may be more natural: an algorithm as in Table 2 may be executed to determine where to put cache stops (e.g. in addition to putting cache stops in strategic places to reduce compute, an algorithm may also place them to ensure a process does not overflow private caches). The result of this is a set of cache stops needed to reduce compute overhead and fit into private caches, and this can be used to determine whether the portioned processes fit into a cache corresponding to the cache stop. The Table 3 example algorithm is as follows:

TABLE 3

For clarity, suppose the aim is to fit the entire graph g into a
deep tensor column. In general, the example algorithm
can be applied to any subgraph of the graph g, including
all of g, without any modification to the example algorithm
below aside from inputting the desired subgraph.
Depending on the nature of the subgraph, this may lead to
better results. This may also be used to repeatedly call
the algorithm on subgraphs of g that are not yet in a deep
tensor column.
Initialize "L3 output tile size" equal to the output tile size
used for a subtensor column ending at an output node
of the target tensor column; initialize available_l3_cache
to the size, e.g. in bytes, of the full L3 cache. While L3 is
used as an example of the cache corresponding to cache stop,
other caches may be used.
find_deep_tensor_column(g, l3_stops, available_l3_
cache, L3_output_tile_size, do_recursive_breakdown),
where g is the entire neural network before tensor
column writing, represented as a graph where nodes
stand for data and edges stand for operations/layers; and TABLE 3-continued

```
l3_stops is the set of nodes, representing data,
that have already been chosen as cache stops:
    Start at output of deep tensor column.
    Go backwards, taking preimages of operations and keeping
    track of the data usage to compute the current output tile.
    The data usage is computed differently from the algorithm of Table 2.
    Instead of counting the data usage internal to a subtensor
    column, a process may only count the data usage at L3 stops.
    If the data usage exceeds the available_L3_cache,
    a process may identify the first cache stop (e.g. L3 stop;
    note this is going backwards from the output, so the
    first one is closest to the output) at which the data usage
    exceeds some fraction of available L3 cache (for example, 50%).
        There is some amount of data needed to compute
        at this cache stop or L3 stop, in order to compute
        the desired output tile. This may be
        termed cache stop or L3 stop v, the set of data
        needed to compute at v may be termed S_v,
        which may be considered to represent a patch of data
        needed to compute the tile. The size of S_v may be
        represented in bytes, but S_v may detail the coordinates
        of the data needed to compute at v.
        Curr_tensor_column = tensor column starting at v and ending at
        output, with tile size L3_output_tile_size.
        If do_recursive_breakdown is false:
            Return curr_tensor_column
        Construct a subgraph g' formed by all edges that come
        before v in g, so that v is the output of g'. Make the set of data
        computed at v overall in g' equal to S_v. Only keep sets
        of data in g' that are used in computing S_v.
        Construct l3_stops' to be the L3 stops up to
        (and not including) v.
            New_tensor_column := find_deep_tensor_
            column(g', l3_stops', remaining_l3_cache,
            tile(v)), where remaining_l3_cache tracks
            how much space is left in L3 cache for this deep
            tensor column to use, and tile(v) is the shape of the
            tiles for the subtensor column ending at v.
            Verify that the overall data usage,
            when new_tensor_column
            is used to compute S_v, then the rest of the current tensor
            column is used to compute the output, fits into L3 cache.
                If it does not fit, retry the current function
                call using a smaller fraction of L3
                cache before we call recursively.
                If the fraction goes below some threshold
                (e.g., 25%), abort.
        // When the process arrives here, the tensor column constructed
        fits into L3 cache.
        Append results of recursive call to find_deep_tensor_column to
        curr_tensor_column.
        Return curr_tensor_column.
    Try repeating find_deep_tensor_column() starting with a
    larger output tile size. Choose the largest tile
    size that returns a tensor column, and use its
    returned tensor column as the deep tensor column breakdown.
is yields all the information needed to execute the set of operations in
a deep tensor column, e.g. the set of operations.
```

In Table 3, curr_tensor_column defined may include, for example:
- the set of operations that are in the tensor column, e.g. matrix multiply, convolution, or pooling operations, represented for example in an Open Neural Network Exchange (ONNX), TensorFlow, or other format.
- an L3 output blocking that describes the size of the output tiles of the tensor column that make the relevant data fit into the cache corresponding to the cache stop
- a list of recursively contained deep tensor columns (possibly empty).
- a list of sub-tensor columns within the deep tensor column (must be non-empty). This list does not include sub-tensor columns used in the recursively contained deep tensor columns, just the ones for the "current" deep tensor column.

While the cache level used for sharing or stops is discussed, as one example, as an L3 cache, and the cache level used to hold data for each sub-tensor is discussed, as one example, as an L2 cache, each of these functions can be done with other cache levels. For example, any non-shared cache may store data private to sub-tensors, and this data may be shared among sub-tensors using any shared cache. The cache used to store data for a specific sub-tensor need not be private. Using a shared (e.g. L3) stop, threads corresponding to sub-tensors may execute through layers each keeping data in its associated private (e.g. L2) cache, and then write the result of the final layer of the thread to a cache buffer (e.g. L3) that is shared among the threads. Each thread stops at this point. Then, subsequent or serial threads are started again with the shared buffer as their input, execute the subsequent layers in using their private caches, and then write the final result into a shared (e.g. L3) cache buffer, and stop.

In some embodiments, each sub-tensor is represented as one single computational thread; however, the threads can be broken down between separate sub-tensor columns. Embodiments may analyze the threads resulting from a partition to determine if all cores of a processor are used or saturated, and if not, break sub-tensor threads into sub-threads to increase parallelism, and saturate or oversaturate processing to ensure all cores are being used. The coherence of the shared cache may be used as a fast and inexpensive way to share the computational results of overlapping sub-tensor processes, so they do not have to be recomputed or written to main memory.

Embodiments may provide a solution that avoids the polynomially growing overheads of the overlapping computations. A mechanism may eliminate the polynomially blowup and also can avoid the recomputation overhead and memory accesses of running deep tensor columns that span many layers. Embodiments may use a larger shared next level cache, e.g. the shared L3 cache, as a coordination space to allow larger input regions in order to avoid a growth in the number of overlaps of smaller regions of columns in the (typically private) L2 caches. The input region size for tensor columns may be dictated by the cache size. Smaller L2 caches can hold columns with input regions much smaller than those that can be held by a larger L3 cache. Embodiments may use this property of larger L3 caches to eliminate the polynomially growth in the overlap of columns had they been executed only in L2.

While L3 and L2 caches are described as being part of one embodiment of the invention, other cache schemes may be used, and embodiments of the invention may produce tensor columns or pyramids which do not keep data exclusively in cache or out of memory.

Deep tensor columns processed according to some embodiments may ensure that NN execution stays as much as possible inside caches (e.g. the L2 and L3 caches) of a CPU. A process according to some embodiments of the invention may include a mechanism to scan the network backwards, in a depth wise fashion from outputs to inputs, and break the computation down into deep tensor column tasks that are executed separately. Each tensor column task may execute in a cache friendly "sub-window" region of the network (e.g. a shared/private cache combination such as L3/L2 cache) and try to go as deep as possible in the layers associated with this sub-window, so that the results currently residing in the L3/L2 CPU caches will be reused as much as possible before any memory (e.g. DRAM) access is needed (e.g. to flush outputs to off-chip memory). A scheduler process may manage these tasks so that they are coordinated across the inputs and the network so as to maximize the level of independence and thus the level of parallelism between tasks.

FIG. 2 depicts a breakdown or division of a deep tensor column into sub-tensor blocks, according to embodiments of the present invention. Referring to FIG. 2, NN 350 may be divided into multiple deep tensors such as deep tensors 302 and 303. Deep tensor 303 does not have its sub-tensors shown for clarity; deep tensor 302 may be divided into sub-tensors 332A, 332B, and 332C. Breaks, "shared cache stops" or L3 stops 306 may occur between sub-tensors 332 which are precedent and subsequent to one another in the sense that the precedent subtensor produces output used by the subsequent subtensor. At shared cache stop 306 sub-tensor calculations may write their results to a shared cache, e.g. an L3 cache, and subsequent sub-tensors may read data. For example, sub-tensor columns 332A may execute, and each sub-tensor columns 332A may write its final results to a cache (e.g. cache 110, see FIG. 3) associated with a cache stop 306, and subsequent sub-tensor columns 332B may read that data from the cache as input; each of sub-tensor columns 332A and 332B may use a lower level, smaller cache (e.g. cache 109) for its internal computations.

Breaks 306, and other boundaries such as the input 332 or output 333 of the NN, or other boundaries such as layers, may define sections 334, such that within each section 334 there may be multiple sub-tensors or sub-pyramids, possibly contained within in different deep tensors; deep tensors may run across multiple sections. Each sub-tensor column 332 may be executed between or may run between stops 306 and/or input 332 or output 333 of the NN or other boundaries. Buffers 340 may be sections of data input to or output from the NN or layers, e.g. stored in memory or cache. Multiple operations 342 such as convolutional operations, transform data input from the left to output on the right. Operations other than convolutional operations may be used. Operations 342 may represent NN layers.

The specific breakdown of NN processing into tensor column and sub-tensor tasks may depend on the hardware, number of cores, and shared and private cache sizes; thus the breakdown may need to be performed at run-time when these parameters are known, to achieve best possible performance Embodiments may allow the threads running the various tensor column computations to run a synchronization and memoization algorithm to share each other's overlapping computations without having to coordinate through memory or recompute from scratch, e.g., by using other synchronization tools such as atomics.

Sub-tensor columns may need to synchronize their input/outputs to avoid conflicting overwrites of data. To detect where this synchronization is needed, the dependencies between sub-tensors (for example, represented by a graph) may be used. If a collection of tasks run serially (for example, inside a single thread), then synchronization would not be necessary. However, if the tasks are running concurrently (e.g. in different threads), then atomics or other methods may be used.

In FIG. 2 it can be seen that a first deep tensor (that included three regions: uppermost subtensor 332A, uppermost subtensor 332B, and subtensor 332C), if executed separately from a second deep tensor (that included three regions: second from uppermost subtensor 332A, second uppermost subtensor 332B, and subtensor 332C), would perform some calculations duplicate to calculations performed by the second deep tensor. It may be that a deep tensor combining the first deep tensor and second deep tensor would not fit in cache and would require memory access. To both avoid memory access and avoid duplicate calculation, deep tensors may execute such that subtensors 332A write to cache at cache stop 306 and subtensors subtensor 332B read from this cache stop, such that subtensors 332A do not reproduce results when subtensors 332B execute and require input. Thus executing a deep tensor without a cache stop may cause certain specific NN operations, such as convolutional, matrix multiply, or pooling, to be performed more than once, which typically does not happen when a NN is not divided into tensors. Using a cache or L3 stop may allow multiple parallel sub-tensors to write results to and read results from a cache that is typically shared among cores (e.g. L3 cache). This may allow a sub-tensor that is subsequent in the NN execution to another subtensor to read a result from a shared cache corresponding to a cache stop, instead of having two parallel subtensors compute that same result. That overlap, e.g. between sub-tensors within a section 334 and also within the same deep tensor, may be termed private or L2 cache overlap, e.g., overlap between green regions. Embodiments may shorten or reduce the regions of a NN with computational overlaps, and improve execution by reducing both memory access and duplicate execution.

While shared cache is discussed as being a cache-stop cache, other caches may be used, e.g. any suitable cache larger than the private cache used for sub-tensors may be a cache-stop cache.

A computerized process according to some embodiments (e.g. Tables 1-3 or other example algorithms described) may analyze the data structure of a NN, and the parameters of a target architecture (e.g. dimensions of caches), and may produce one or more tasks or threads. The produced tasks may be or may include partitions of NN such as deep tensors, sub-deep tensors or sub-tensors. Tasks may be or include data structures (e.g., a table, a linked list, etc.) representing a subset or partition of a NN, including nodes, weights and edges. Tasks may include representations (e.g., matrices) of kernels of a NN. The tasks may be executed, e.g. per the example method of FIG. 4, using, for example, a computer system as in FIG. 3.

Embodiments may be used for inference (e.g. producing an output at run time) and also training in a back-propagation process. During a training stage, input to a layer may include incoming training data, including one or more of feedback data (e.g., supervised training data) and back-propagation data (e.g., cost-function data), loss data, etc. that may be required to train a NN.

Figure 3:
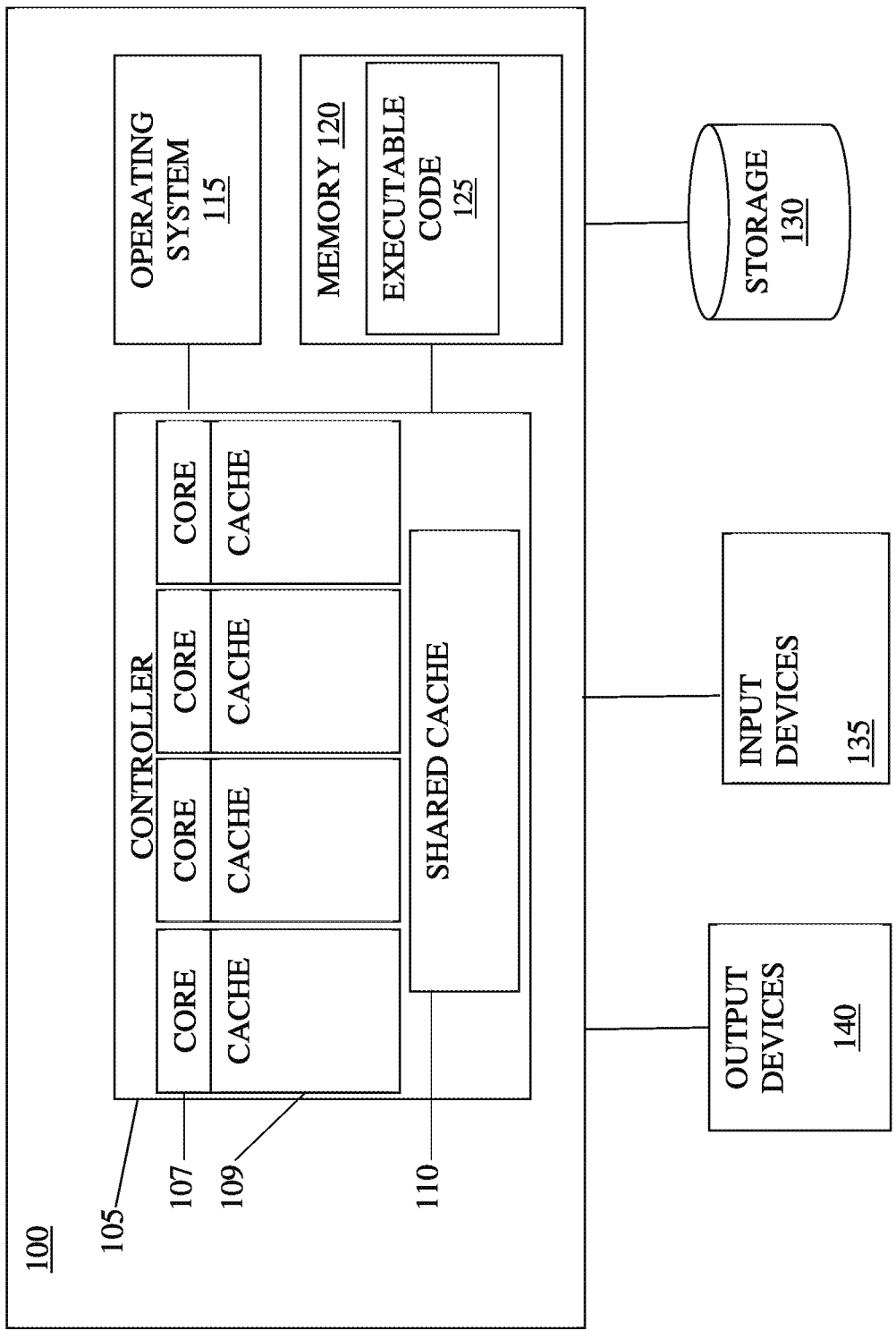
FIG. 3 shows a high-level block diagram of an exemplary computing device which may be used with embodiments of the present invention.

FIG. 3 shows a high-level block diagram of an exemplary computing device which may be used with embodiments of the present invention. In some embodiments the computing device 100 of FIG. 3 may execute NN inference or training using NNs partitioned as described herein and/or partition a NN as described herein. Computing device 100 of FIG. 3 may be a NN execution or creation platform, such as a computer within a device (e.g. a car), personal computer, laptop, smartphone, workstation, server, cloud computing system, etc.

Computing device 100 may perform such functions using e.g. one or more processors such as processor 105, each of which may include multiple cores 107 (e.g. 4, 18, or other numbers), each such core having associated with it one or more private or local caches, such as an L1 cache (not shown) and a larger, higher level L2 cache 109, local to or accessible only by that core, and the multiple cores in a processor sharing an even larger, higher level shared cache 110 (e.g. L3 cache), the caches located typically within or as part of the processor on the same chip. Other caches and cache structures may be included. Although example embodiments are described in terms of L1, L2, and L3 cache levels as in INTEL architectures, embodiments apply to any other architecture, with different cache designs. L1 cache may be faster and smaller than L2 cache which may be faster and smaller than L3 cache. L1 cache may be faster to access by cores than L2 cache which may be faster than L3 cache. L2 and L1 may be much smaller and faster than L3 and are separate for each core; each core may have its own L1 and L2 cache while the last level, the L3 cache may be shared across all the cores on a die. Memory 120 (e.g. DRAM typically external to the die on which the cores exist) is larger than caches but typically an order of magnitude slower memory. Embodiments of the invention may help overcome CPUs' limitations of slower memory and less compute when compared with GPUs. CPUs often have fewer cores (e.g. less than 10) when compared with GPUs which often have thousands of cores; CPUs often have slow memory bandwidth when compared to GPUs. Embodiments described herein are directed at CPUs but can also be valuable in GPU architectures.

Cores 107 may access tasks, code and data via references to external memory 120. The manner and frequency of access of this data, and the size of the sections of data accessed, may cause the data to be kept in caches such as caches 109 and 110. Memory 120 may be external to processor 105 and for example not on the same chip as cores 107 and caches 109 and 110; as opposed to caches, which are typically on the same chip as the processor, local to the processor or internal to the processor, or closer to the processor than memory 120. In some embodiments, some or all of cache storage may be off-chip, not on the same chip as processors or cores, but in general, access to it is faster than access to memory 120. Embodiments may tailor memory accesses and the size of tensors, sub-deep tensors, or sub-tensors, and/or of memory needed for such processes, with the cache policy of the target processor executing the NN in mind so that after data is read to a certain cache it typically remains in cache while being read and written by a thread, until and unless it is written back to memory 120. Caches may be handled as is known in the art by a cache policy particular to the type or model of processor 105. Tensors or sub-tensor columns may be designed to have a size such that the cache policy determines that data related to the processes is saved within a first layer of cache and/or second layer of cache.

Controller or processor 105 may be or include, for example, one or more central CPUs, one or more GPUs, a chip or any suitable computing or computational device. Processor 105 may be one integrated circuit and cores 107 may be separate processing units each reading and executing program instructions. Thus a single processor 105 can execute different instructions or threads on different cores 107 at the same time, increasing overall speed for programs that support multithreading or other parallel computing techniques.

Computing device 100 may include an operating system 115, a memory 120, a storage 130, input devices 135 and output devices 140. Operating system 115 may be or may include any code segment to coordinate, schedule, arbitrate or control operation of computing device 100, for example, scheduling execution of programs. Memory 120 may be or may include, for example, a Random Access Memory (RAM), a read only memory (ROM), a Dynamic RAM (DRAM), a Flash memory, a volatile or non-volatile memory, or other suitable storage. Memory 120 may include a plurality of, possibly different memory units. Memory 120 may store instructions to carry out a method (e.g. code 125) as described herein, and/or data such as NN data, data describing a NN, NN kernel information, etc.

Executable code 125 may be any executable code, application, program, etc. and may be executed by controller 105. Executable code 125 may when executed cause NN execution or inference, or the partition of a NN, according to embodiments described herein. For the various modules and functions described herein, one or more computing devices 100 or components of computing device 100 may be used. Devices that include components similar or different to those included in computing device 100 may be used and may be connected to a network and used as a system. One or more processor(s) 105 including cores in processor(s) 105 may be configured to carry out embodiments of the present invention by for example executing software or code.

Storage 130 may be or may include, for example, a hard disk drive, a floppy disk drive, a Compact Disk (CD) drive, a universal serial bus (USB) device or other suitable storage. Data such as instructions, code, NN model data, parameters, etc. may be stored in a storage 130 and may be loaded from storage 130 into a memory 120 where it may be processed by controller 105. In some cases such data may be loaded from a lower level cache to a higher level cache. Some of the components shown in FIG. 3 may be omitted.

Input devices 135 may be or may include for example a mouse, a keyboard, a touch screen etc. Output devices 140 may include displays, speakers and/or any other suitable output devices. Any suitable number of output devices may be operatively connected to computing device 100 as shown by block 140. Any applicable input/output (I/O) devices may be connected to computing device 100.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause or configure the processor to carry out methods disclosed herein.

Figure 4:
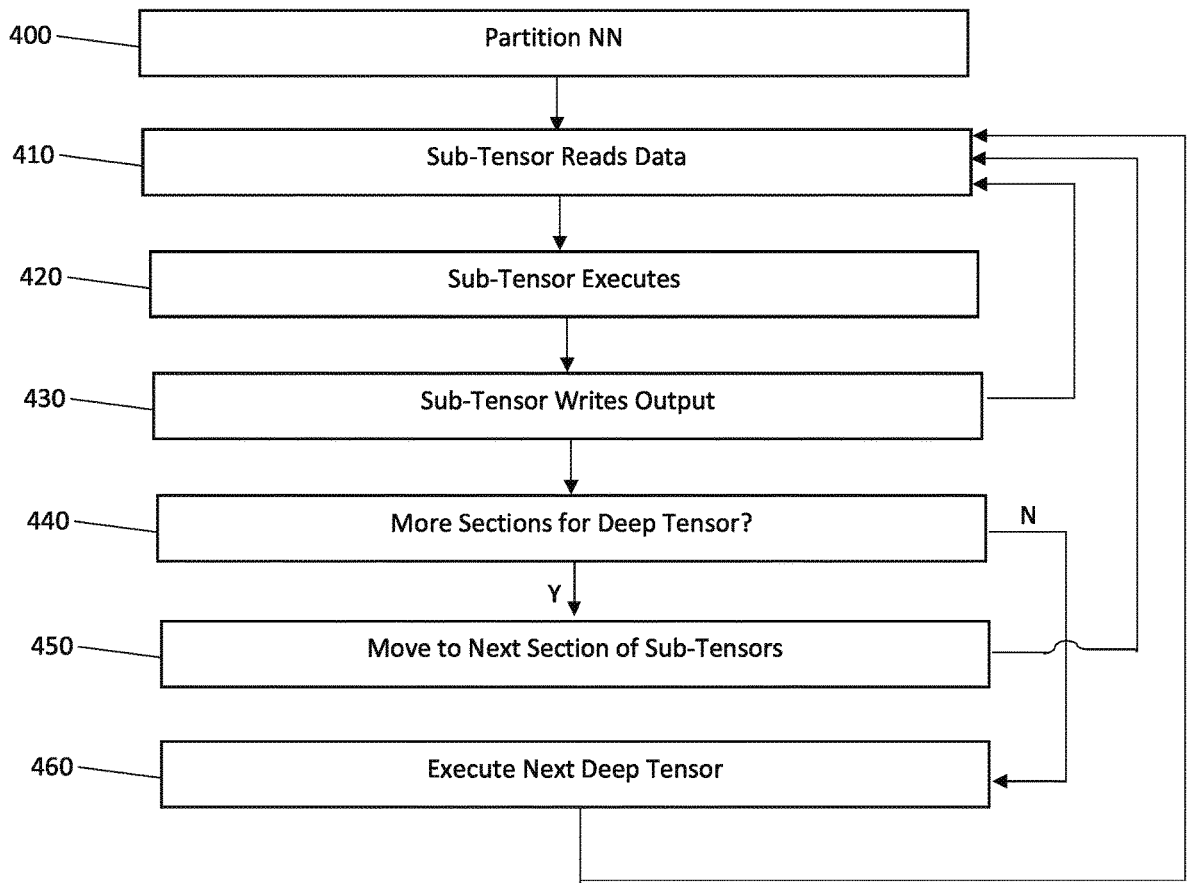
FIG. 4 is a flowchart depicting a method according to embodiments of the present invention.

FIG. 4 is a flowchart depicting a method according to embodiments of the present invention. The operations of FIG. 4 may be used with systems and NN architectures such as depicted in FIGS. 1-3, but other systems and architectures may be used. FIG. 4 depicts processing of at least a portion of a NN using deep/sub-tensors: other NN processing may occur, in particular since the entirety of the NN may not be segmented into deep/sub-tensors.

Referring to FIG. 4, in operation 400, a NN may be partitioned into a deep tensor or deep pyramid which includes multiple sub-tensors or sub-pyramids. Partitioning may use algorithms such as the examples in Tables 1-3 herein or other algorithms discussed herein. The partitioning may be part of a compiler process, such that operation 400 may produce NN code that may be executed in operations 410-460.

During partitioning, the NN, and the execution of the NN, may be divided or partitioned at least in part into multiple deep tensors or deep pyramids, such that the output from each deep tensor column does not overlap. Typically a deep tensor or deep pyramid is organized into sections such as sections 334 of FIG. 2, the sections defined, divided by or bordered by the input to the NN, the output to the NN (or input to and output from non-partitioned NN portions), and cache stops such as cache stop 306 of FIG. 2. Borders other than the start and end of the NN may be used; for example a layer and not a cache stop may be a border. Within each section may be one or more sub-tensors or sub-pyramids, and during execution each sub-tensor or sub-pyramid within a section bordered by cache stops or other breaks may execute before execution within the deep tensor continues past that cache stop, although parallel execution within a section bounded by cache stops or breaks may occur. Further, typically each deep tensor executes completely before another deep tensor begins execution, although parallel execution may occur.

The deep-tensors may be depth wise strips of the NN, which may be additionally partitioned into smaller depth wise strips, sub-tensor columns. Within a sub-tensor column, calculations may execute sequentially, a process may wait for the results of parallel sub-tensor columns within one deep-tensor to collect before moving on to the next group of parallel sub-tensor columns within that deep-tensor. The computation within a single deep tensor column may execute one group of parallel sub-tensor columns at a time: these sub-tensor columns typically span multiple operations, so in this sense this execution may be depth wise, but a process may wait for one parallel group of sub-tensor columns to finish before moving on to the next group, and in this sense processing may be sequential. Further, sub-deep tensors within the same deep tensor may be executed separately, and have their outputs combined into a cache stop, before the next portion of the deep tensor executed sequentially towards NN output.

The partitioned NN, e.g. code produced by partitioning, may be executed at inference. In operation 410, a sub-tensor or sub-pyramid process may read data, e.g. from the input of a NN, or from a cache such as a shared cache into which a previous (e.g. immediately serial) sub-tensor process has written the data. For example, referring to FIG. 2, a sub-tensor 332B may take input data from a shared cache that had been written to that cache by a sub-tensor 332A. If a sub-tensor 332A is executing, it may take input from the input to the NN, or from a prior layer in a conventional manner Each sub-tensor column may include computations from portions of more than one layer: e.g. each sub-tensor may span multiple layers but include calculations for only a subset of each layer it spans; each portion of a layer for the sub-tensor may be less than the entirety of that layer.

In operation 420, the sub-tensor may execute or be executed, e.g. by a processor. In some embodiments, the sub-tensor may execute or be executed entirely within a cache such as a private cache, e.g. the sub-tensor's intermediate calculations may not be saved to a cache layer higher or larger than the private cache of the core executing the sub-tensor, or to memory. This may occur because the sub-tensor is sized so that data, once read to a target cache layer, does not need to be written to memory. Each sub-tensor column may execute or process between sections defined by cache stops or NN input or output, such that the input data of and the output data from the sub-tensor, combined, fits within the second layer of cache (e.g. is not written back to memory until the end of execution of a deep tensor column).

In operation 430, the sub-tensor may save or write its output, for example to memory if it executes in the last or output layer of the NN, or to the same cache (e.g. shared cache) from which it received input. The sub-tensor may save its output entirely within a second layer of cache. In some embodiments processes may save output to a certain cache layer, or fit all intermediate processing data within a cache layer, because the processes are designed with the specific cache size and cache policy of the target architecture in mind, such that the amount of data saved will fit within the intended cache (e.g. a cache within a first or second layer) and not be written to memory (possibly until some later time). Operations 410-430 may repeat for a certain deep tensor: more sub-tensors or sub-deep tensors may read data, execute and write data as in operations 410-430 until all processing for the collection of parallel sub-tensors within the deep tensor, and within a section bounded by cache stops or other boundaries, is finished.

In operation 440, if it is determined if there are more sections (e.g. portions between cache stops, or bounded by cache stops and input to or output from a deep tensor) for the deep tensor, in operation 450, processing may move to the next, subsequent, section containing sub-tensors or sub-pyramids for the deep tensor; and if there are no more sections, in operation 460, processing may move to execute the next deep tensor.

In operation 450, processing may move to the next section of the current deep tensor, the next section typically being the section towards the NN output, or the section receiving input from the current (prior to next) section. The flow may move to operation 410 to execute sub-tensors or sub-deep tensors within that next section. In operation 410 a next group of sub-tensor columns may accept input from the output saved across multiple operations 430 such that each of the subsequent group of sub-tensor columns receives its input from the second, e.g. shared, layer of cache In operation 460, if there are more deep tensors forming the NN, processing may move to operation 410 starting with the next deep tensor; if there are no more deep tensors forming the NN, processing may stop, at least for the deep/sub-tensor processing: other NN processing may occur, in particular since the entirety of the NN may not be segmented into deep/sub-tensors.

Other or different operations may be used.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of executing a neural network (NN), the method comprising:
   for each of a plurality of sub-tensor columns, each sub-tensor column comprising computations from portions of a plurality of layers of the NN:
     executing the sub-tensor column so that data usage of the sub-tensor column during execution is entirely within a first layer of cache;
     the sub-tensor column saving its output entirely within a second layer of cache, the first layer of cache being lower than the second layer of cache; and
   executing a second plurality of sub-tensor columns, each of the second plurality of sub-tensor columns receiving its input from the second layer of cache;

wherein a first plurality of sub-tensor columns forms a first tensor column, and a second plurality of sub-tensor columns forms a second tensor column, an output from the first tensor column and an output from the second tensor column not overlapping.

2. The method of claim 1, wherein at least one portion of the portions of a plurality of layers of the NN is less than an entirety of a layer.

3. The method of claim 1, wherein the first layer of cache is a private cache.

4. The method of claim 1, wherein the execution is performed on a processor having a cache policy, the sub-tensor columns having a size such that the cache policy determines that data is saved within the first layer of cache and the second layer of cache.

5. The method of claim 1, wherein the second layer of cache is a public cache.

6. A method of partitioning an execution of a neural network (NN), the method comprising:
    partitioning the execution of the NN into a plurality of sub-tensor columns, each sub-tensor column comprising computations from portions of a plurality of layers of the NN;
    each sub-tensor column performing computations so that data usage of the sub-tensor column during execution is entirely within a first layer of cache and saving its output entirely within a second layer of cache, the first layer of cached being lower than the second layer of cache; and
    at least one plurality of sub-tensor columns receiving input from the second layer of cache; and
    wherein the partitioning comprises partitioning the NN into sections, at least one of the sections defined by a first cache stop and a second cache stop, the first and second cache stops corresponding to the second layer of cache.

7. The method of claim 6, comprising partitioning the NN into sections, at least one of the sections defined by a first cache stop and a second cache stop, wherein within each sub-tensor column, processing between the first cache stop and the second cache stop accepts input data and produces output data, the input data and the output data combined fitting within the second layer of cache.

8. The method of claim 6, wherein the first layer of cache is a private cache.

9. The method of claim 6, wherein the second layer of cache is a public cache.

10. A system for executing a neural network (NN), the system comprising:
    a memory; and
    a processor configured to:
        for each of a plurality of sub-tensor columns, each sub-tensor column comprising computations from portions of a plurality of layers of the NN:
        execute the sub-tensor column so that data usage of the sub-tensor column during execution is entirely within a first layer of cache;
        wherein the sub-tensor column is to save its output entirely within a second layer of cache, the first layer of cache being lower than the second layer of cache; and
    execute a second plurality of sub-tensor columns, each of the second plurality of sub-tensor columns receiving its input from the second layer of cache; wherein a first plurality of sub-tensor columns forms a first tensor column, and a second plurality of sub-tensor columns forms a second tensor column, an output from the first tensor column and an output from the second tensor column not overlapping.

11. The system of claim 10, wherein at least one portion of the portions of a plurality of layers of the NN is less than an entirety of a layer.

12. The system of claim 10, wherein the first layer of cache is a private cache.

13. The system of claim 10, wherein the execution is performed on a processor having a cache policy, the sub-tensor columns having a size such that the cache policy determines that data is saved within the first layer of cache and the second layer of cache.

14. The system of claim 10, wherein the second layer of cache is a public cache.

15. A system for partitioning an execution of a neural network (NN), the system comprising:
    a memory; and
    a processor configured to:
        partition the execution of the NN into a plurality of sub-tensor columns, each sub-tensor column comprising computations from portions of a plurality of layers of the NN;
        each sub-tensor column performing computations so that data usage of the sub-tensor column during execution is entirely within a first layer of cache and saving its output entirely within a second layer of cache, the first layer of cached being lower than the second layer of cache; and
        at least one plurality of sub-tensor columns receiving input from the second layer of cache;
        and wherein the partitioning comprises partitioning the NN into sections, at least one of the sections defined by a first cache stop and a second cache stop, the first and second cache stops corresponding to the second layer of cache.

16. The system of claim 15, wherein the processor is configured to partition the NN into sections, at least one of the sections defined by a first cache stop and a second cache stop, wherein within each sub-tensor column, processing between the first cache stop and the second cache stop accepts input data and produces output data, the input data and the output data combined fitting within the second layer of cache.

* * * * *